United States Patent [19]

Carrington et al.

[11] 4,376,411
[45] Mar. 15, 1983

[54] PRINT HAMMER LIMIT CONTROL

[75] Inventors: James E. Carrington, Vestal; Gerald R. Westcott, Endicott, both of N.Y.

[73] Assignee: International Business Machines Corporation, Armonk, N.Y.

[21] Appl. No.: 353,287

[22] Filed: Mar. 1, 1982

[51] Int. Cl.³ .............................................. B41J 1/20
[52] U.S. Cl. .............................. 101/93.14; 101/93.03; 101/93.29
[58] Field of Search ............... 101/93.03, 93.14, 93.29, 101/93.34, 93.48; 178/23 R, 69 G

[56] References Cited

U.S. PATENT DOCUMENTS

| | | | |
|---|---|---|---|
| 3,885,469 | 5/1975 | Sugimoto et al. | 101/93.48 |
| 3,944,741 | 3/1976 | Harris et al. | 178/23 R |
| 4,236,447 | 12/1980 | Matsuzaki et al. | 101/93.14 |
| 4,273,041 | 6/1981 | Bolcavage et al. | 101/93.14 |

OTHER PUBLICATIONS

IBM Tech. Discl. Bulletin, vol. 20, No. 4, 9/77, pp. 1319-1320.

Primary Examiner—Edward M. Coven
Attorney, Agent, or Firm—John S. Gasper

[57] ABSTRACT

A hammer limit control for an on-the-fly line printer comprises a counter which counts compare signals from a compare circuit which detects coincidences of print data and type position data in synchronism with the motion of an endless type carrier. The counter maintains a running count of the number of compare signals for a control interval having a duration which is a function of the printing interval of a print line cycle. A hammer on storage device stores a plurality of compare counts registered by the counter at the end of each of a plurality of control intervals. An adder adds the running count registered in the counter to the total count stored in the storage means and stores the total sum in a hammer on register. When the total sum in the hammer on register equals a maximum number, a limit comparator generates a control signal which inhibits further comparisons by the compare circuit. The content of the hammer on storage device is updated each control interval by transferring the compare count registered in the compare counter to the storage device and by deleting the oldest count in the hammer on storage after a predetermined number of control intervals. The maximum number is stored in a register which is programmable.

14 Claims, 7 Drawing Figures

PRINT HAMMER LIMIT CONTROL

FIELD OF THE INVENTION

This invention relates to line printers and particularly to a printer control for limiting the number of print hammers that can be turned on at any given time during the printing operation.

CROSS REFERENCE TO RELATED APPLICATION

Application of D. Dayger et al, entitled "Control System For Timing Hammers Of Impact Printers", Ser. No. 338,709, filed Jan. 11, 1982.

BACKGROUND OF THE INVENTION

Line printers operate by the random selection and firing of individual print hammers in a row of hammers which effect a sharp impact between a print medium and the type characters on a continuously moving type carrier. The type carrier may be a revolving, flexible type belt, band, chain or rotating drum. Various numbers of print hammers can be turned on on each print cycle. This is dependent on the data to be recorded in a given line. The rate at which hammers are turned on depends on the distribution of characters on the type carrier in the print line. Controlling the maximum number of hammers which can be turned on at any time in the course of the print line cycle is a problem with this type of printer. The problem arises from the fact that hammers when fired remain turned on for an interval of several print scans or cycles of a print line cycle during which random numbers of other print hammers are being fired and turning off. Hammer number limit control schemes which depend on detecting and counting actual hammer firing pulses versus hammer reset pulses or pulses of a pulse rate generator are not satisfactory especially in very high speed printers and particularly where the controls utilize delay or other circuitry as a means for compensating for flight time variations of the hammers. Limit controls which count hammer drive pulses and clock or pulse rate generation for limit detection and control require circuit redesign where printers are to be operated at different speeds. Likewise, where print hammers are delayed different amounts before firing difficulty can be experienced in the circuitry for detecting when the hammers are turned off and conventional counter means are not effective to detect simultaneous or near simultaneous driving pulses and reset pulses.

BACKGROUND ART

U.S. Pat. No. 4,236,447 issued Dec. 2, 1980 to K. Matsuzaki et al, discloses a printing column number limiting device which uses a reversible counter which increases in count value in response to hammer drive signals to a hammer drive mechanism and decreases in count value in response to reset signals to the hammer drive mechanism. When the counter reaches a predetermined value n, an inhibit signal is generated to block the production of the drive and reset signals. In a second embodiment, the reversible counter is connected to decrease its count value by pulses from the hammer drive when turned off.

U.S. Pat. No. 3,944,741 issued Mar. 16, 1976 to S. C. Harris, Jr. et al, describes a print rate control system using a unidirectional counter for controlling the number of characters recorded over a short control interval along with a reversible counter for controlling the maximum number of characters recorded over a longer control interval. Both counters count pulses from a print data and type data comparator connected to activate hammer drive circuitry. The unidirectional counter is reset at the end of each short control interval. The reversible counter is connected by a switch to either of two rate pulse generators to subtract from the count of the drive pulses depending on the switching speeds at which the printer is intended to print.

IBM Technical Disclosure Bulletin, Vol. 20, No. 4, September 1977, pgs. 13-19 et seq. describes a system for controlling the maximum number of print hammers fired over a period of time which uses an up/down counter decremented by clock pulses and incremented by hammer fire pulses. A maximum count in the counter is decoded to block the gating of clock pulses to the counter. A zero count in the counter is decoded to block gating of the drive pulses to the counter.

U.S. Pat. No. 3,885,469 issued May 27, 1975 to T. Sugimoto et al, describes a hammer magnet operating time compensation system which uses a plurality of counters for detecting from the printing information in storage the number of hammers that will be turned on during a printing interval and predicting from that number the resulting change in the drive voltage and adjusting the duration of the drive voltage applied to the hammers to control their instant of impact.

U.S. Pat. No. 4,273,041 issued June 17, 1981 to R. D. Bolcavage et al, describes a hammer limit control in which the number and sequence of print hammers to be fired in each subscan is precalculated and arranged in a print position fire table PPFT. The table contains print position PP count information representing the number of print hammers to be fired each subscan. In the course of building the print position fire table PPFT, the print position count in the table is checked with a maximum count number and a print position will not be stored in the PPFT if the stored count equals the maximum count. During printing, no determination is made for limiting the number of hammers turned on.

SUMMARY OF THE INVENTION

It is the object of this invention to provide a hammer limit control which does not depend directly on actual detection and/or counting of drive and turn off or reset signals.

It is the specific object of this invention to provide a hammer limit control which is independent of the need for actually determining hammers turned on and off.

It is a further object of this invention to provide a hammer limit control in which the maximum or limit can be changed readily to accommodate different print operating speeds or other operating changes without the need for redesigning or replacing control circuitry.

It is a specific further object to provide a hammer limit control in which the changes in the maximum or limit are readily programmable.

It is a still further object to provide a hammer limit control which is readily adapted for operation and control using programmable data processing devices such as a microprocessor.

In accordance with this invention, the above as well as other objects are achieved through a hammer limit control which provides that the number of hammers that are turned on is determined on the basis of prediction and probability. The determination of the number of the hammers in the turned on state is determinable at any instant in the course of printing and an overload condition is anticipated. Further the limit control allows the maximum number to be varied without circuit alteration to accommodate operating conditions or requirements.

Basically the invention achieves these results by providing a single counter and a storage device. The counter which is unidirectional and resettable counts compare signals from a compare circuit which detects coincidences of the print data and the type position data in synchronism with the motion of the type carrier. The counter maintains a running count of the number of compare signals for a control interval which is a function of the printing interval of operation of a print line cycle. The storage means stores the compare signal count registered in the counter means at the end of each of a plurality of control intervals. The invention provides means for preventing further selection of the print hammer means including means for predicting from the combination of the running count data contained in the compare counter and count data stored in the storage means when the hammers turned on will equal a predetermined maximum number. Means is also provided for updating the count data in the storage means by transferring the count registered at the end of each count interval into the storage means from the counter means.

The prediction means further includes an adder which provides a total sum count by combining the count data registered in the counter means with the count data in the storage means. The total sum is stored in a register and compared by a comparator circuit with a maximum number stored in a second register which is programmable. When the total sum coincides with the maximum number the comparator circuit generates a control signal on its output connection to the compare circuit of the printer control to prevent further compares of the print and type position data. The invention further includes an arrangement for updating the count data stored in the storage means at the end of each control interval. The count in the counter means is written into the storage means and replacing the oldest count data stored therein. The updated count data is then read out to the adder means which generates a subtotal sum. The subtotal sum is stored in a subtotal sum register and used thereafter by the adder for computing the total sum for each compare signal count in the counter. With such an arrangement, the maximum number can be readily changed by applying a new number to the maximum count register. Also the number of counts stored in the storage means can be varied depending on the operating time of individual print hammers. Thus the same basic control arrangement can be used for various print hammers without redesigning the basic control circuitry.

DESCRIPTION OF A PREFERRED EMBODIMENT

Figure 1:
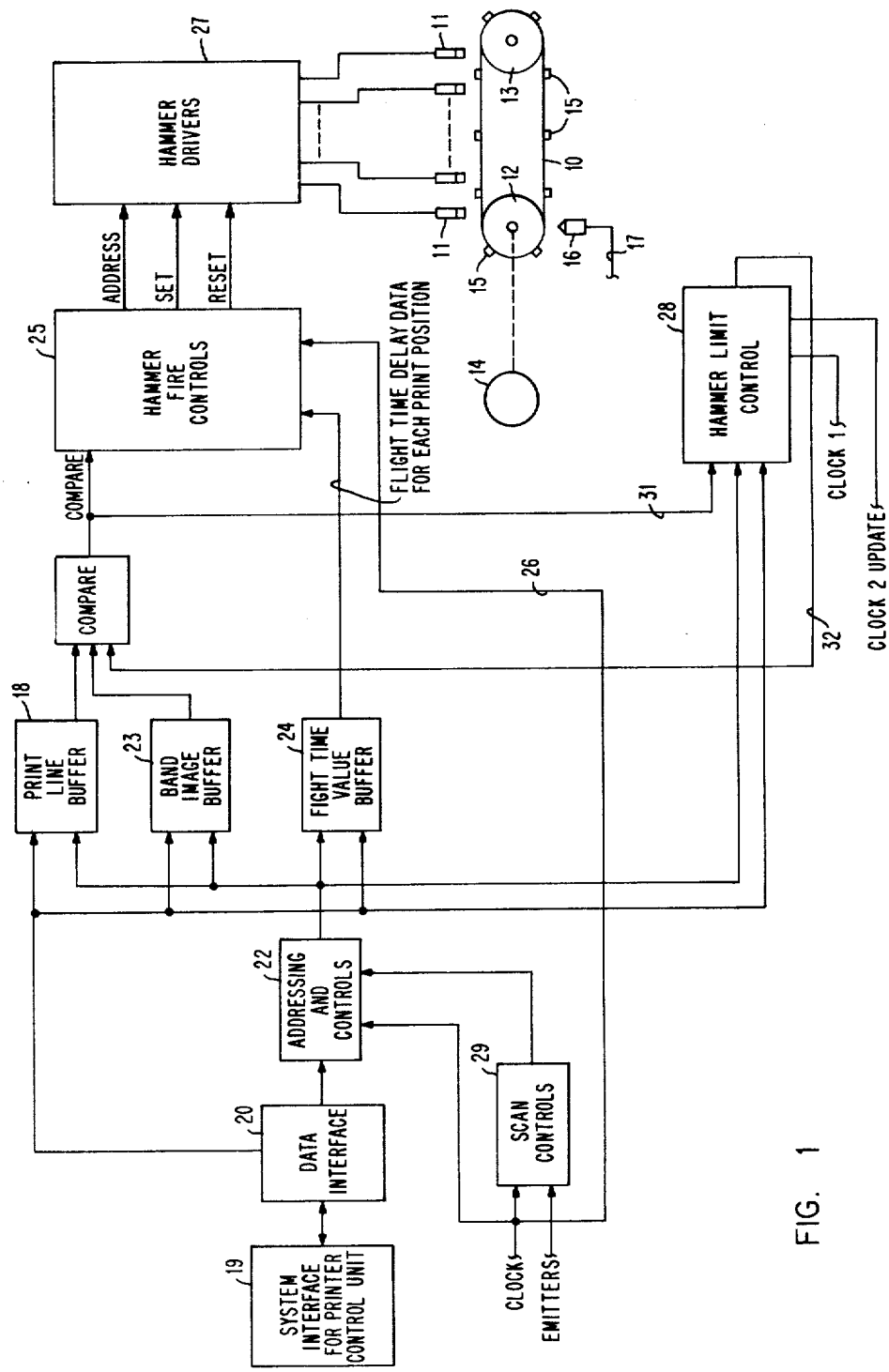
FIG. 1 is a block diagram of a printer control system incorporating the invention.

As seen in FIG. 1, a suitable print mechanism for practicing the invention comprises a continuous type belt or band 10 and electromagnetically operated print hammers 11 arranged in a row parallel with a straight portion of band 10. Band 10 is supported by rotatable drive pulleys 12 and 13, one of which may be connected to a drive motor 14 which operates to move the type band 10 at one or more speeds which is maintained constant during the printing operation. Engraved type elements 15 which may be characters or other graphic symbols are spaced uniformly around band 10 but at a pitch which differs from the spacing of hammers 11. Due to the pitch differential type elements 15 align as subgroups with subgroups of hammers 11 during band motion in accordance with a plurality of recurring scan/subscan sequences. The scan/subscan principle of operation is well known and further detailed information can be obtained from U.S. Pat. No. 4,275,653 issued June 30, 1981 to R. D. Bolcavage et al. In a particular arrangement in which the invention is practiced, the print mechanism can have 168 print hammers for 168 print positions of a print line spaced 10 to the inch. Type band 10 may have 480 type elements 15 spaced 0.133 inches thereby providing 4 subscans per print scan. With this arrangement the complete revolution of band 10 would break down to 480 scans. Band 10 has timing marks (not shown) which may also be engraved for sensing by a transducer 16 which and generates emitter pulses on line 17 to be used for timing the operation of the printer control in synchronism with the motion of band 10 and for the ultimate firing of the hammers 11. Emitter pulses are generated by transducer 16 preferably at the rate of one emitter pulse per print scan. These pulses may be subsequently subdivided to generate subscan pulses equal to the number of subscan alignments of characters 15 with hammers 11.

In the printer control arrangement of FIG. 1, print line buffer PLB 18 is a read/write memory device which stores a line of data to be printed which is received from a system interface 19 through data interface 20 on data bus 21. Data transfer can take any form but preferably is serial by word parallel by bit. The data to be printed is arranged in PLB 18 by address and control logic 22 in the sequence in which it is to be printed in a line of data by the print mechanism.

Band image buffer BIB 23 is a read/write memory device in which an image of the printable characters of type belt 10 are stored in precisely the same arrangement as type elements 15 appear on type band 10. Flight time value buffer FTB 24 stores delay values used by hammer fire controls 25. These delay values are used by fire controls 25 in conjunction with clock pulses on line 26 to Set and Reset addressed hammer drivers 27 whereby they are turned on and off to compensate for flight time variations of hammers 11 and to control the energy delivered to the electromagnets which produce hammer impact. Further details of the operation of the hammer fire controls 25 may be understood by reference to the related application.

Data used for limiting the number of print hammers 11 turned on concurrently is supplied on data bus 21 from interface adapter 20 under control of address and control logic 22 to hammer limit control 28 to be further described hereinafter. Scan control logic 29 receives emitter pulses from transducer 16 on line 17 in conjunction with clock signals to control operation of address and control logic 22 for performing subscan readouts of character data from PLB 18 and BIB 23. Comparator 30 responds to print character data input from PLB 18 and type element data from BIB 23 and generates a compare equal or Initiate Fire signal when the character data at the print position in PLB 18 corresponds with the type element data aligned with the corresponding print position to activate hammer fire controls 25 which turn on the selected hammer driver 27 after a suitable time delay for the specific hammer in accordance with the delay data supplied by FTB 24. Hammer fire controls 25 issues a Set signal to correspondingly addressed hammer driver 27 turning on the appropriate hammer 11. The output of comparator 30 has a connection 31 to hammer limit control 28 which has a feedback connection 32 for delivering an inhibit signal to comparator 30. As will be described hereinafter, hammer limit control 28, generates an inhibit signal when the number of compare signals applied on line 31 over a period of time equals a maximum number of print hammers as indicated by hammer limit data supplied from system interface 19 on data bus 21.

Figure 2:
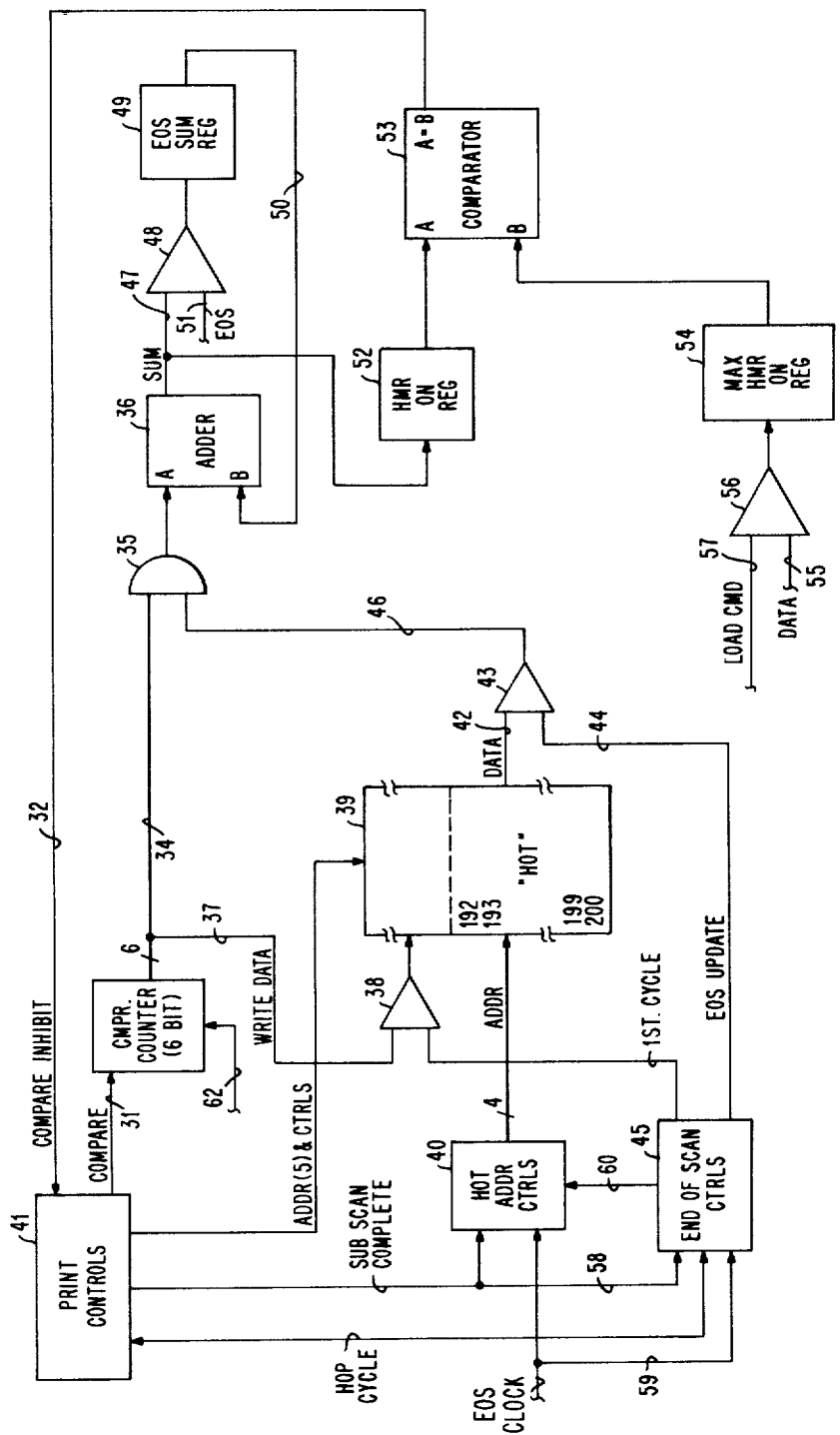
FIG. 2 is a block diagram showing the general arrangement of the hammer limit control of FIG. 1.

In a preferred embodiment of the hammer limit control 28 as shown in FIG. 2, compare counter 33 receives compare signals on line 31 from comparator 30 of (see FIG. 1) the print controls 41. Compare counter 33 which is preferably a 6-bit counter but may vary with the application has an output connected by bus 34 through OR circuit 35 to the A input of adder 36. The output of compare counter 33 is also connected by bus 37 through AND gate 38 to storage buffer 39. Buffer 39 is a random access memory device which in accordance with this invention has storage locations, 192–200 for example, which forms a Hammer On Table (HOT) in which a plurality of counts registered by compare counter 33 for a plurality of successive control intervals are stored. In the preferred manner in which the invention is practiced, the HOT stores compare counts for a plurality of control intervals whose combined duration substantially equals the effective flight time or operating time of the print hammers, each control interval therefore being a fraction of the flight time. The control interval can also be a function of the print interval. The HOT portion of buffer 39 is addressed by Hammer On Table (HOT) address controls 40 for both reading and writing operations. Count data read from the HOT of buffer 39 appears on data bus 42. This data is gated through AND circuit 43 by an EOS Update pulse on line 44 from an end-of-scan EOS control 45. Count data from the HOT gated through AND circuit 43 is supplied on bus 46 through OR circuit 35 to the A input of adder 36.

The sum generated, by adder 36 from the count data read from the HOT is applied on bus 47 through AND gate 48 to an EOS sum register 49. Register 49 has a feedback bus connection 50 to the B input of adder 36. An EOS control pulse on line 51 gates the data on line 47 to EOS sum register during the update cycle of operation of the hammer limit control. During the prediction cycle of operation, adder 36 totals the count value from compare counter 33 at its A input with the sum in register 49 at its B input and applies this total sum on bus 47 for storage in hammer on HO register 52. Limit comparator 53 has an A input connected to HO register 52 and a B input connected to a maximum hammer on Max HO register 54. Maximum number data is supplied on bus 55. A Load command signal on line 57 gates the maximum data through AND circuit 56 to Max HO register 54. Comparator 53 generates a Compare Inhibit signal on feedback line 32 when the data in HO register 52 and Max HO register 54 are equal. This Compare Inhibit signal on line 32 applied to print controls 41 prevents further compare signals from being generated to the compare counter 33 on line 31.

The hammer limit control in accordance with this invention has two operating cycles or phases, the prediction or compare cycle and the update cycle. In the compare cycle, referring to FIGS. 1 and 2, compare counter 33 maintains a running count of the compare signals from comparator 30 produced by coincidences from the scanning of the PLB 18 and BIB 23 during the sequence of subscan operations of a print line cycle. Each time a compare signal is generated, adder 36 sums the quantity registered in counter 33 at input A with the quantity at input B from EOS sum register 49 on feedback bus 50. In the compare cycle, line 51 is inactive so that the total sum output from adder 36 on bus 47 is stored in HO register 52 for comparison with Max HO register 54 by limit comparator 53. At the beginning of the print line cycle, no hammers will have been turned on so that the sum quantity in register 49 is zero. Therefore, the sum on bus 47 placed in HO register 52 is initially equal to the count in counter 33. After a predetermined control interval which is a function of the print subscans a control interval EOS pulse is applied on line 59 by an external clock to the EOS control 45. The frequency of occurrence of the control interval pulse is related to the print subscans, however, it is more or less arbitrary and can be independent of the print interval and preferably is a fraction of the operational time of the print hammers. Specifically the preferred manner for practicing this invention is to have a control interval pulse with a period more directly related to and which is a fraction of the effective flight time of the print hammers as that term is defined more completely in the co-pending related application.

The compare cycle is ended and the update cycle begun by the application of the control interval pulse EOS clock on line 59 along with a subscan complete (SSC) pulse from printer control 41 on line 58 to EOS control 45. A suitable SSC signal might be generated as part of the operation of the PLB scanning circuitry which may be a subscan ring counter (not shown) which turns on a latch in its last count condition for a specified time in a manner more fully described hereinafter. The update cycle begins and continues during a dead period 78 (see FIG. 5) between subscans. This assures that no hammers will be selected, i.e. no compare signals are generated, since no data is being supplied from PLB 18 and BIB 23 to compare circuit 30.

Each update cycle of hammer limit control 28 comprises a write operation followed by a read operation. In the write operation HOT address control 40 is operated to point to a storage location of the HOT and the count registered in compare counter 33 and on bus 37 is written into a storage location of HOT of buffer 39 by HO address control 40. At the end of the first control interval of a print line cycle, the first storage location, e.g. 192, is selected by a first cycle pulse on line 61 to AND circuit 38 and the contents of counter 33 is written into this location. Counter 33 can then cleared be to zero by a pulse on line 62. Immediately following the write cycle, the read operation occurs. In the read operation all N storage locations of the HOT are addressed sequentially by HOT address control 40 and the EOS update signal from EOS control 45 on line 4 gates the data read from the HOT through AND circuit 43 and OR circuit 45 to the A input of adder 36. In the first read out at the end of the first control interval of a print line cycle, read out begins and ends at the second storage location, e.g. location 193. In the second update cycle the count registered in counter 33 is written into the second storage position, i.e. 193, and reading begins and ends at the third position 194 in preparation for writing the third count at the end of the third update cycle. The same write/read sequence is repeated in all subsequent update cycles of the print line cycle. In this manner the contents of the data stored in the HOT is updated during the update cycle by replacing the oldest stored count with the newest or most recent count registered in the counter. This process of replacement removes the oldest count data which in effect removes the count data for those print hammers whose operation should predictably have been terminated by the hammer fire control circuitry from the further prediction and control of the hammer limit.

During the read operation an EOS signal is applied on line 51 to AND circuit 48 between adder 36 and sum register 49. Each count data item of the HOT from buffer 39 is thus sequentially added to the preceding data items of the HOT by the adder 36 until a subtotal EOS sum is produced and stored in sum register 49 after which the compare operation resumes.

At the end of the first control interval only the first storage location 192 will have count data assuming compare signals were generated and counted during the first control interval. All other positions being zero, the subtotal sum stored in register 49 is equal to the count in position 192. After N control intervals, however, the updated sum in register 49 is the sum of N counts of the HOT which is the subtotal sum supplied to adder 36 at input B for continuous addition during the compare cycle to the successive counts registered in counter 33 and applied through OR circuit 35 to input A. With the counter cleared to zero at the beginning of a subscan a sum equal to the quantity stored in the sum register 49 is also stored in HO register 52. Thus in the following compare cycle adder 36 stores a new sum in HO register 52 for each compare signal count registered in counter 33. Since in the preferred manner of practicing the invention the compare signals occur prior to the firing of the print hammer, the sum supplied by adder 36 and stored in hammer on register 52 is essentially a predicted quantity based on the number of hammers which should have been turned on and those which will be turned on in the course of printing operation. Thus the limit comparator 53 is capable of acting in advance to prevent further compare signals from being generated and before hammers are turned on which might exceed the desired maximum.

Figure 3:
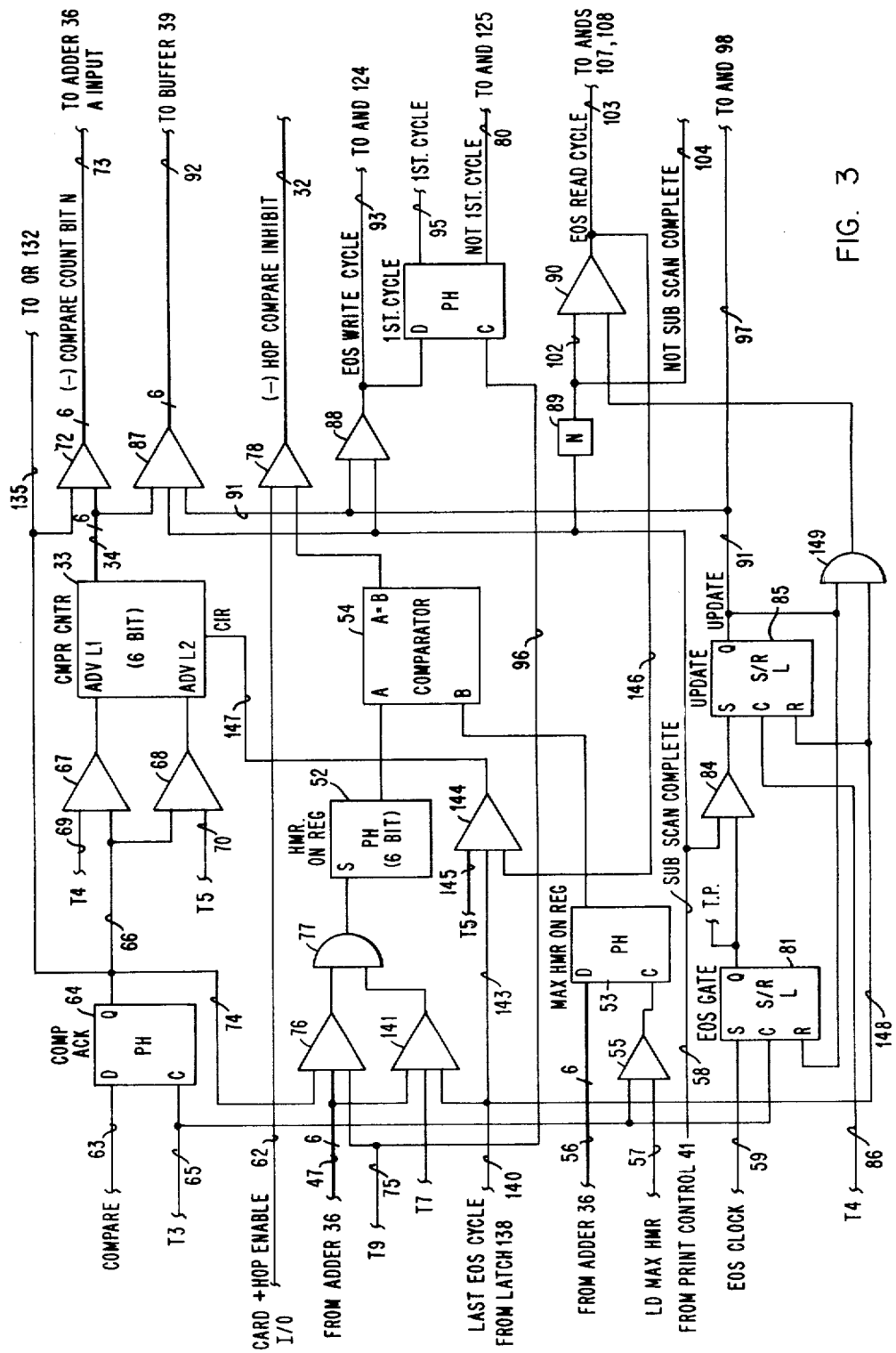
FIG. 3 is a logic diagram showing further details of a portion of the block diagram of FIG. 2.
Figure 4:
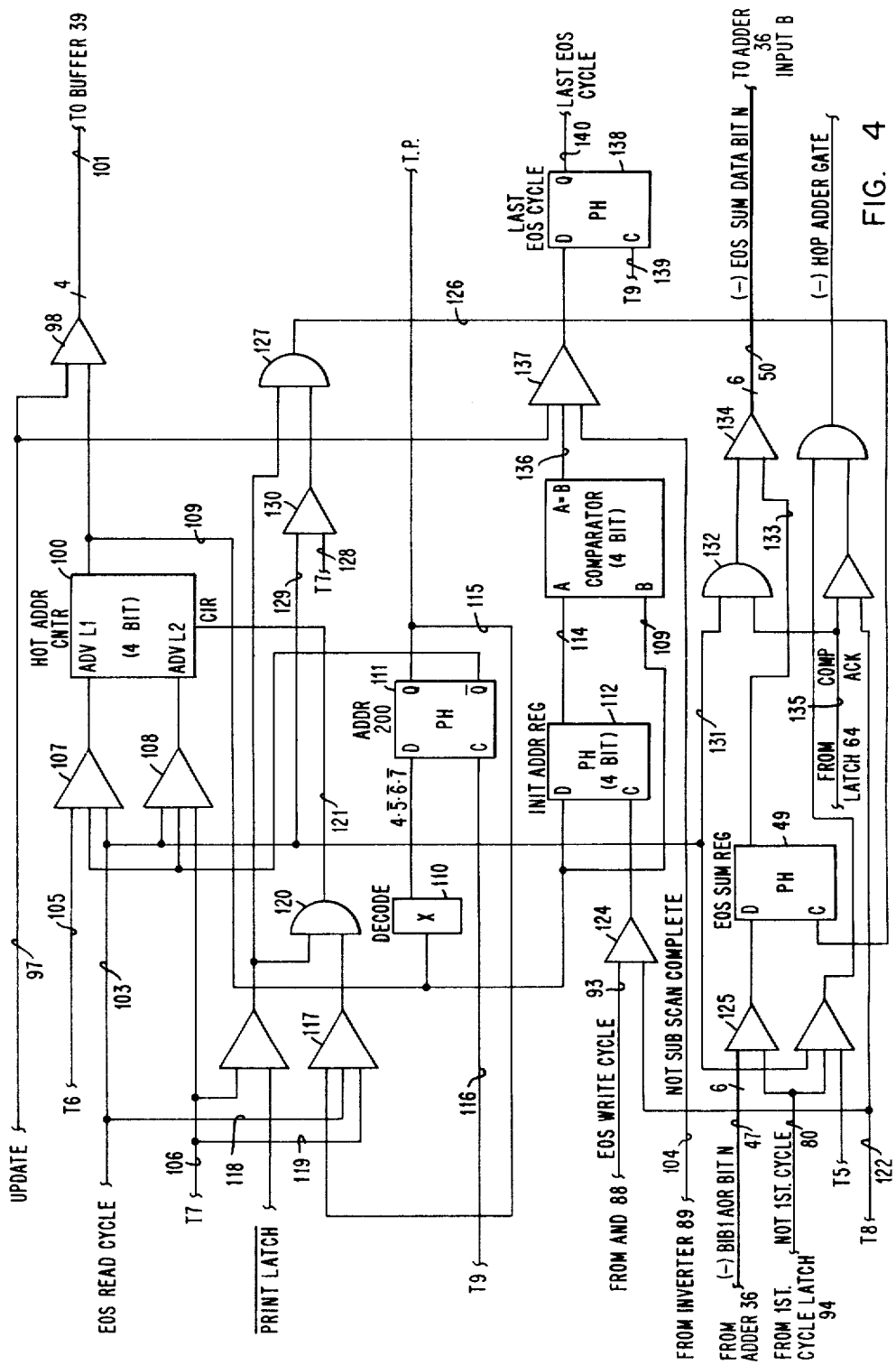
FIG. 4 is a logic diagram showing more details of another portion of the block diagram of FIG. 2.

A more detailed circuit arrangement for practicing the invention to operate as described can be seen by referring to FIGS. 3 and 4.

Figure 6:
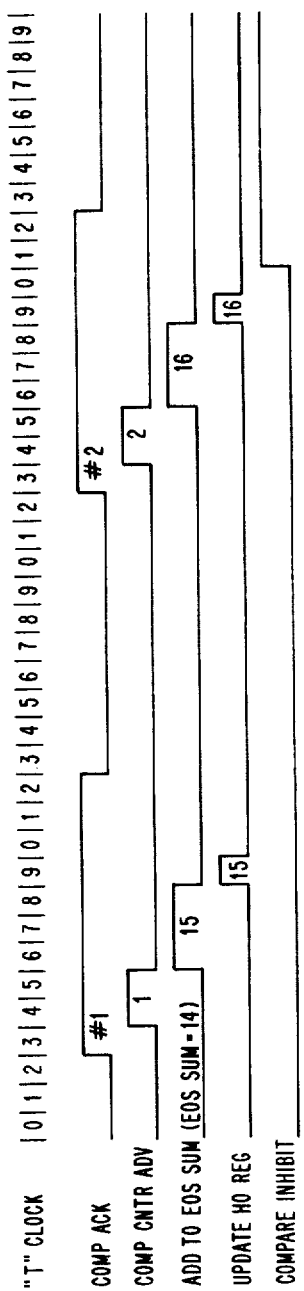
FIG. 6 is a timing diagram illustrating the compare cycle of operation.

Referring to FIG. 3, Comp Ack latch 64 is a polarity hold latch that switches on in response to compare signals on line 63 when enabled by a timing pulse T3 on line 65. Switching on latch 64 produces a counter advance signal on line 66 which is gated through dual AND circuits 67 and 68 to ADVL1 and ADVL2 latches of the input stages of a 6-bit compare counter 33 by timing pulses T4 and T5 on lines 69 and 70 respectively. The counter advance signal serves as a gating signal on line 71 for gating the count registered in compare counter 33 onto output bus 34 through AND circuit 72 and onto bus 73 for application to the A input of adder 36 for summing with the data at its B input (see FIG. 2). The counter advance signal serves further for gating the sum placed by adder 36 (See FIG. 2) onto bus 47 through AND circuit 76 and OR circuit 77 to HO register 52 when enabled by timing pulse T9 on line 75. Limit comparator 54 compares the content of HO register 52 with Max HO register 53 which has been previously loaded with the desired hammer limit data applied from an external source on bus 56 gated by AND circuit 55 by a Load command LD Max pulse on line 57 when enabled at T clock time T3 on line 65. If the data inputs at A and B of the limit comparator 54 are equal, a Compare Inhibit signal is gated through AND circuit 78 by a HOP enable signal on line 62 onto line 32 to the printer control. The timing of this sequence is illustrated in FIG. 6 where Comp Ack shows latch 64 being switched on at T3 time of the T clock and remaining on until the following T3 time, then switching off for a like period to be again switched on at the following T3 time. This assumes a compare signal has occurred every other time latch 64 was enabled, i.e. every other T3 enable time. FIG. 6 also illustrates the compare counter 33 being advanced (Comp/Cntr/Adv) at T4, T5, adder 36 performing the summation (Add to EOS Sum) at T6 to T9, HO register being updated (Update HO Reg) at T9, and limit comparator 53 producing the Compare Inhibit pulse at time T1 of the next clock cycle. When generated, Compare Inhibit remains on until the quantity in HO register 52 is reduced in later control intervals below the count in Max HO register 54.

Figure 5:
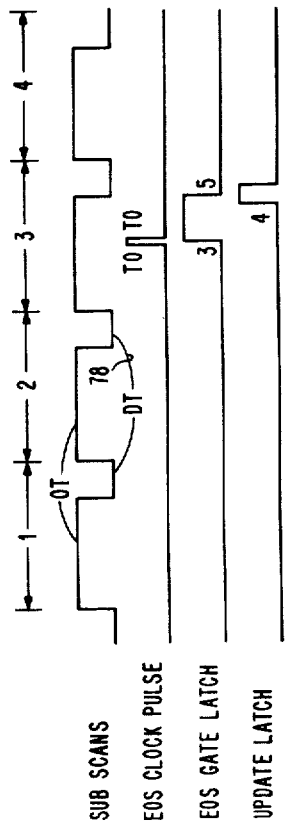
FIG. 5 is a timing diagram for explaining the relationship of the hammer limit control and print operation timing.

From FIG. 6 it is seen that latch 64 in enabled every other T3 time and is timed to occur for an interval during which a hammer option will occur. The number of enablements of latch 64 in a subscan of course equals the number of hammers optioned all of which will occur in accordance with the invention during the subscan option time OT of a subscan, as shown in FIG. 5. No hammer options occur during the subscan dead time DT.

The update cycle begins with a regularly occurring EOS clock pulse from an external clock or the like (not shown) on line 59 to EOS gate latch 81 which is enabled by the T3 pulse for a full T clock cycle on line 65. At that time, an SSC pulse on line 58 from printer control 41 (see FIG. 2) is gated through AND circuit 84 by EOS gate latch 81 to switch update cycle latch 85 when enabled by a T4 clock pulse on line 86 which applies update signal on lines 91 and 97. The SSC pulse on line 58 is also applied to AND circuits 87 and 88 and to inverter 89 connected by line 102 to AND circuit 90. When switched on, latch 85 applies an Update Cycle pulse on line 91 for (1) gating with the SSC pulse present on line 83 the count on bus 34 through AND circuit 87 onto bus 92 for writing into the HOT of buffer 39 and (2) gating through AND circuit 88 to generate an EOS Write Cycle pulse on line 93 or alternatively a 1st Cycle pulse on line 95 by switching the 1st cycle latch 94 when enabled by T9 pulse on line 96. Latch 85 when switched on also produces line 97 an Update Cycle pulse on (see FIG. 4) to AND circuit 98 for gating the count on bus 99 from HOT address counter 100 to bus 101 for addressing HOT of buffer 39 to write the data on bus 92 in the appropriate storage location of the HOT.

Figure 7:
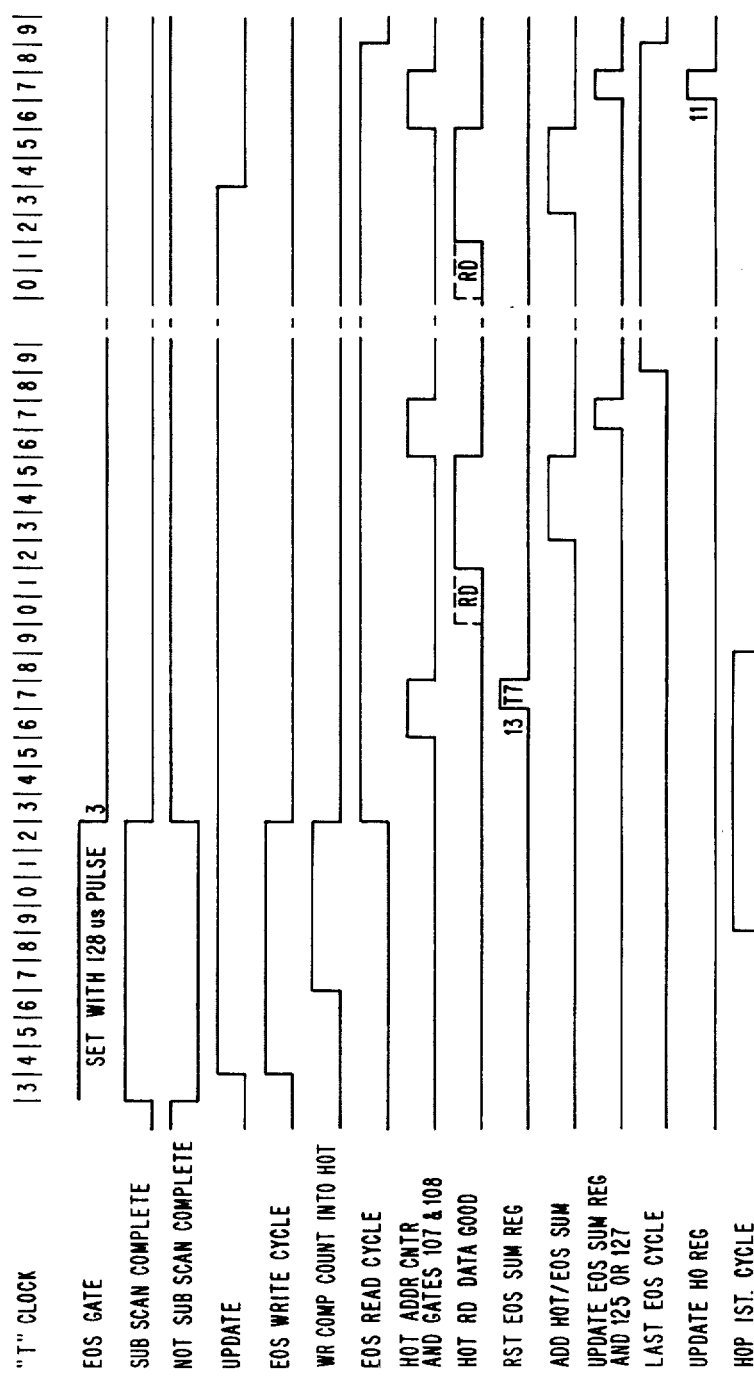
FIG. 7 is a timing diagram showing the update cycle of operation.

As seen in FIGS. 3 and 7, the read portion of the update cycle begins with the SSC pulse on line 83 dropping at T3. This causes inverter 89 to raise line 102 to AND circuit 90 to produce and EOS read cycle pulse on line 103 to begin the read portion of the update cycle. Inverter 89 when line 83 is raised also applies a Not SSC signal on line 104.

As seen in FIG. 4, the HOT address control comprises HOT address counter 100 with output bus 99 connected to AND circuit 98. An Update signal from latch 85 (see FIG. 3) gates addresses set in counter 100 onto bus 101 for addressing the N storage locations of the HOT of buffer 39. The HOT is read as previously described by advancing counter 100 to address N storage locations of the HOT beginning at and returning to an initial address which is the next address following the write of the compare count into the HOT. Counter 100 is advanced through this address cycle by an EOS read cycle pulse on line 103 for gating T6 and T7 timing pulses (see Adv HOT Addr Cntr, FIG. 7) on lines 105 and 106 respectively through dual AND circuits 107 and 108 to the ADVL1 and ADVL2 input stages of counter 100. The output of counter 100 is also connected by bus 109 through decode logic 110 to a last HOT address register 111 to an initial address register 112 and the B input of comparator 113 which has an A input connected by bus 114 to the output of initial address register 112. When decode 110 indicates the address of the last storage position of the HOT in buffer 39, e.g. 200, last address register 111 generates a reset signal on line 115 in response to a T9 timing pulse on line 116. The reset signal on line 115 is gated through AND circuit 117 by the EOS read cycle pulse on line 118 and a T7 timing pulse on line 119 through OR circuit 120 onto line 121 for clearing counter 100. The reset signal on line 121 clears counter 100 to the address of the first storage position, e.g. 192, of the HOT.

The initial address register 112 is enabled by the combination of a T8 timing pulse on line 122 and an EOS write cycle pulse on line 93 to AND circuit 124. This operates initial address register 112 to store the address on bus 109 which is the address for writing the count registered in compare counter 33.

During the readout cycle, the data read out is supplied to the A input of adder 36. The data from each storage location of the HOT is added to the quantity stored in the sum register 49 applied to input B. The sum generated by adder 36 is then restored during the read operation into sum register 49. FIG. 4 shows the sum from adder 36 on bus 47 gated through AND circuit 125 by a Not-1st Cycle pulse on line 80 from latch 94. The sum on bus 47 is stored in the EOS sum register 49 when enabled by a signal on line 126 from OR circuit 127 in response to a T7 timing pulse on line 128 and an EOS read cycle pulse on line 129 to AND circuit 130. An EOS Read Cycle pulse on line 131 through OR circuit 132 gates the sum in register 49 on bus 133 through AND circuit 134 onto bus 50 to the B input of adder 36. FIG. 4 also shows the sum in register 49 on output bus 133 being gated through AND circuit 134 to bus 50 for continuous application to the B input of adder 36 by a Comp Ack signal on line 135 through OR circuit 132 during the compare cycle operation.

As seen in FIG. 4, HOT address counter 100 continues its advances (Adv HOT Addr Cntr) at each T6-T7 time, and supplying addresses on bus 99. The HOT data read out is added with the count in the sum register 49 (Add HOT/EOS Sum) the sum stored in the sum register 49 (update EOS sum REG) until comparator 113 detects a B input address from bus 109 equal to the A input address from the initial address register 112. At that time comparator 113 generates a compare equal signal on line 136. The compare equal signal on line 136 is gated through AND circuit 137 by a Not SSC signal on line 104 from inverter 89 and an update signal on line 97. This switches on last EOS cycle latch 138 when enabled by a T9 timing pulse on line 39 to produce a Last EOS Cycle pulse on line 140.

As shown in FIG. 3, the Last EOS Cycle pulse on line 140 is applied (1) to AND circuit 141 which along with a T7 timing pulse on line 142 gates the sum from adder 36 on line 47 through OR circuit 77 to update the hammer on register 52 for the beginning of the compare cycle operation; (2) on line 143 to AND circuit 144 which along with a T5 timing pulse on line 145 and an EOS Read Cycle pulse on 146 applies a clear signal to line 147 to clear compare counter 33; (3) on line 148 to reset update latch 85 at T4. The Last EOS Cycle pulse on line 148 is also applied through OR circuit 149 to AND circuit 90 to keep the EOS Read Cycle pulse on line 103 for the last read operation. After the last read operation address counter 100 is advanced one more time to the next address position at which the count registered in compare counter 33 in the subsequent compare cycle will be written into the HOT.

From the above description it will be seen that a hammer limit control has been provided which is independent of the requirement to actually count hammer fire and reset pulses, which is readily changed to accommodate different operating parameters, and which can be programmed to store different limit quantities without redesigning counter or other control circuitry.

While the invention has been particularly shown and described with reference to a preferred embodiment thereof, it will be understood by those skilled in the art that the foregoing and other changes in form and details made be made therein without departing from the spirit and scope of the invention.

We claim:

1. A printer control system for use in a line printer wherein said line printer comprises a row of print hammers electrically operable for recording data at a plurality of print positions of a print line, a moving type carrier for cyclically presenting type characters at each print position of said print line in sequential print intervals of a print line cycle, and print control means for providing selection signals to hammer operating circuitry for controlling the turn on of said print hammers to effect printing operations in accordance with stored print data and type position data presented during said sequential print intervals in synchronism with the movement of said type characters, said print control means including a hammer limit control comprising first means operative in response to said selection signals provided by said control means for indicating the number of hammers being selected to be turned on in a given control interval whose duration is a function of said print intervals, second means for indicating the number of print hammers selected to be turned on in a plurality of said control intervals preceding said given control interval, said plurality of control intervals having a duration which is a function of the turn on time of said print hammers, means responsive to the combined number of hammers indicated by said first and second means for predicting at any instant of said control interval the total number of print hammers to be turned on, and means responsive to said predicting means for preventing the selection of said print hammers for turning on when said predicted total number of hammers equals a predetermined maximum number.

2. A printer control system in accordance with claim 1 in which said print control means for providing selection signals for turning on said print hammers includes compare means for generating compare signals resulting from the detection of coincidences between said stored print data and type position data, said first means comprises counter means for maintaining a running count of the number of compare signals generated by said compare means during said control interval, said second means includes storage means for storing a plurality of compare signal counts registered by said counter means at the end of each of said plurality of control intervals, said means for predicting said total number of hammers that will be turned on comprises adder means for providing a total sum by adding each running count registered by said counter means during said control interval with said plurality of counts stored in said storage means, and said means for preventing selection of said hammers is operable when said total sum provided by said adder means equals said predetermined maximum number.

3. A printer control system in accordance with claim 2 in which said means for predicting the total number of hammer means that will be turned on further includes means for (1) operating said adder means to first produce a subtotal sum by adding said plurality of counts stored in said storage means, (2) storing said subtotal sum produced by said adder means, and means operable during said control interval in response to said compare signals from said compare means for then operating said adder to add said subtotal sum from said subtotal storage means with each compare signal count in said counter means to produce said total sum.

4. A printer control system in accordance with claim 3 in which said hammer limit control further includes updating means for periodically updating said plurality of compare signal means stored in said storage means by including the compare signal count registered in said counter means at the end of said given control interval, and means for supplying said updated plurality of compare signal counts from said storage means to said adder means for producing an updated subtotal sum for storage in said subtotal storage means.

5. A printer control system in accordance with claim 4 in which said storage means is a read/write storage means having a plurality of storage locations, said updating means includes storage read/write control means including circuit means interconnecting said storage means with said compare counter means and with said adder means, and update cycle control means for operating said storage read/write control means in a first mode for writing said compare count registered in said compare counter means into one of said storage locations of said storage means and in a second mode for sequentially reading said plurality of said storage locations in said storage means for application of compare count data therein to said adder for producing said subtotal sum.

6. A printer control system in accordance with claim 5 in which said updating means further includes control interval timing means for periodically supplying control interval timing signals to said update cycle control means whereby said update cycle control means operates said storage read/write control means in said first and second modes, said control interval timing signal having a time period which is a function of the effective flight time of said print hammers.

7. A printer control system in accordance with claim 6 in which said print control for producing said hammer selection signals further includes subscan timing means for producing subscan signals in accordance with said print intervals of said print line cycle, and said update cycle control means further comprises switch means responsive to the combination of said subscan and said control interval timing signals for controlling the operation of said storage read/write control means in said first and second modes.

8. A printer control system in accordance with claim 7 in which said subscan signals produced by said subscanning means defines subscan intervals each having a subscan option time followed by a subscan dead time during which no hammer options are performed by said print control, said switch means responsive to said subscan and said control interval timing signals being operable during said subscan dead time for controlling the operation of said storage read/write control in said first and second modes.

9. A printer control system in accordance with claim 8 in which said print control further includes means responsive to said subscan signals for generating a subscan complete signal for indicating the end of said subscan option time and the beginning of said subscan dead time said switch means being responsive to said subscan complete signal in combination with said control interval timing signal for controlling operation of said storage read/write control means in said first and second modes during said subscan dead time.

10. A printer control system in accordance with claim 9 in which said switch means comprises latch means for supplying an update signal to said read/write storage control means in response to said control interval timing signal in combination with a. said subscan complete signal for operation in said first mode and b. a Not subscan complete signal for operation in said second mode.

11. A printer control system in accordance with claim 10 in which said storage means is a read/write storage device for storing a hammer on table having N storage locations said hammer on table indicating the number of hammers turned on during N control intervals, said update cycle control means for operating said storage read/write control in said first and second modes includes address means operable in response to said update signal from said latch means and said subscan complete signal in said first mode for addressing an initial storage location I of said table, and means operable in response to said Not subscan complete signal and said update signal in said second mode for operating said addressing means to address said N storage locations of said table in sequence, said addressing means being operable in said second mode beginning and ending each control interval with storage location I +1.

12. A printer control system in accordance with claim 2 in which said means for predicting includes first register means for storing said total sum produced by said adder means, said means for preventing includes second register means for storing said maximum number, and a comparator operatively connected to said first and second register means, said comparator having an output connection for supplying a control signal to said comparison means of said control means for preventing further selection of said print hammers when said total sum in said first register means equals said maximum number in said second register means.

13. A printer control system in accordance with claim 2 in which said hammer limit control further includes updating means for periodically updating said plurality of compare signal counts stored in said storage means by including at the end of each control interval the compare signal count registered in said counter means.

14. A printer control system in accordance with claim 13 in which said updating means is further operable for updating said plurality of compare signals counts in said storage means by excluding a predetermined one of said compare signal counts when said plurality of said compare signal counts equals a predetermined quantity.

* * * * *